(12) United States Patent
Beard et al.

(10) Patent No.: US 10,025,650 B2
(45) Date of Patent: Jul. 17, 2018

(54) DETERMINING A TRACE OF A SYSTEM DUMP

(71) Applicant: International Business Machines Corporation, Armonk, NY (US)

(72) Inventors: Darren R. Beard, Chandlers Ford (GB); Jenny J. He, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/857,045

(22) Filed: Sep. 17, 2015

(65) Prior Publication Data

US 2017/0083389 A1    Mar. 23, 2017

(51) Int. Cl.
*G06F 11/00* (2006.01)
*G06F 11/07* (2006.01)
*G06F 11/34* (2006.01)

(52) U.S. Cl.
CPC ........ *G06F 11/079* (2013.01); *G06F 11/0751* (2013.01); *G06F 11/0778* (2013.01); *G06F 11/0787* (2013.01); *G06F 11/3476* (2013.01)

(58) Field of Classification Search
USPC ...................................... 714/38.11
See application file for complete search history.

(56) References Cited

U.S. PATENT DOCUMENTS

| | | | |
|---|---|---|---|
| 5,274,811 A * | 12/1993 | Borg | G06F 11/3471 714/E11.203 |
| 6,349,314 B1 | 2/2002 | Patel | |
| 6,701,457 B2 | 3/2004 | Reynolds et al. | |
| 6,751,789 B1 * | 6/2004 | Berry | G06F 11/3466 714/35 |
| 6,813,731 B2 * | 11/2004 | Zahavi | G06F 11/3034 714/45 |
| 7,058,768 B2 | 6/2006 | Willman et al. | |
| 7,069,470 B2 * | 6/2006 | Wilding | G06F 11/366 712/244 |
| 7,240,240 B2 | 7/2007 | Balakrishnan et al. | |
| 7,290,175 B1 | 10/2007 | Kessler et al. | |
| 7,308,609 B2 | 12/2007 | Dickenson et al. | |
| 7,418,635 B2 | 8/2008 | Schulstad | |

(Continued)

OTHER PUBLICATIONS

"Steps for gathering additional data for abends", IBM Knowledge Center, Printed on Jun. 29, 2015, © Copyright IBM Corporation 1990, 2010, pp. 1-5, <http://www-01.ibm.com/support/knowledgecenter/SSLTBW_1.12.0/com.ibm.zos.r12.e0zk100/e0z1k14009.htm%23wq115>.

(Continued)

*Primary Examiner* — Amine Riad
(74) *Attorney, Agent, or Firm* — Alexander G. Jochym

(57) ABSTRACT

An approach for determining a trace of a system dump. The approach receives a system dump request, wherein the system dump request includes performing, by one or more computer processors, a system dump utilizing a dumping tool, wherein the system dump includes a trace wherein the trace comprises one or more trace entries collected in a trace table. The approach determines an initial trace of the system dump. The approach determines a time period to collect trace entries following the system dump. The approach determines an updated trace table. The approach determines an extra trace utilizing an exit program.

9 Claims, 3 Drawing Sheets

(56) References Cited

U.S. PATENT DOCUMENTS

| | | | |
|---|---|---|---|
| 7,506,203 B2 | 3/2009 | Nellitheertha | |
| 7,506,207 B2* | 3/2009 | DeWitt, Jr. | G06F 11/3466 |
| | | | 712/227 |
| 7,509,521 B2 | 3/2009 | Iwakura et al. | |
| 7,836,344 B2 | 11/2010 | Morse et al. | |
| 7,941,707 B2 | 5/2011 | Sarig et al. | |
| 8,769,342 B2 | 7/2014 | Tindal et al. | |
| 8,863,091 B2* | 10/2014 | Dageville | G06F 11/3636 |
| | | | 717/124 |
| 9,442,791 B2 | 9/2016 | Bello et al. | |
| 9,519,564 B1 | 12/2016 | Merrill | |
| 2003/0135720 A1* | 7/2003 | DeWitt, Jr. | G06F 11/3466 |
| | | | 712/228 |
| 2005/0120162 A1 | 6/2005 | Sivaram | |
| 2006/0015780 A1* | 1/2006 | Fong | G06F 9/383 |
| | | | 714/51 |
| 2008/0126301 A1 | 5/2008 | Bank et al. | |
| 2011/0029819 A1 | 2/2011 | Mehta et al. | |
| 2011/0320873 A1 | 12/2011 | Abrams et al. | |
| 2012/0151278 A1 | 6/2012 | Tsantilis | |
| 2012/0185730 A1 | 7/2012 | Moran et al. | |
| 2012/0246518 A1* | 9/2012 | Francis | G06F 11/3476 |
| | | | 714/45 |
| 2015/0324254 A1 | 11/2015 | Prasad et al. | |
| 2016/0048441 A1 | 2/2016 | Husar et al. | |
| 2017/0075751 A1 | 3/2017 | Grande et al. | |

OTHER PUBLICATIONS

List of IBM Patents or Patent Applications Treated as Related (Appendix P), filed herewith.
U.S. Appl. No. 14/943,383, filed Nov. 17, 2015.

* cited by examiner

DETERMINING A TRACE OF A SYSTEM DUMP

BACKGROUND

The present invention relates generally to system dumps, and more particularly, to determining a trace of the system dump.

When a problem occurs in a mainframe product, the product may undergo a system dump. A system dump may also include memory dumps, product dumps, or other dump methods known in the art. The system dump captures the storage contents of the product at the time of the failure, which can subsequently be sent to service personnel for problem determination. Typically, a system dump includes a trace that shows, by means of a chronological series of trace entries, the operations of the product before the problem occurred. The trace entries show which tasks were running and how they were operating before the problem occurred. Typically, determining the trace of the product's operations concludes when the product undergoes the system dump, and the trace does not show the effects on the tasks after the problem occurred.

SUMMARY

Aspects of the present invention provide a method, computer program product, and a computer system for determining a trace of a system dump, in accordance with an embodiment of the present invention. The method includes receiving, by one or more computer processors, a system dump request, wherein the system dump request includes performing, by one or more computer processors, a system dump utilizing a dumping tool, wherein the system dump includes a trace wherein the trace comprises one or more trace entries collected in a trace table. The method includes determining, by one or more computer processors, an initial trace of the system dump. The method includes determining, by one or more computer processors, a time period to collect trace entries following the system dump. The method includes determining, by one or more computer processors, an updated trace table. The method includes determining, by one or more computer processors, an extra trace utilizing an exit program.

DETAILED DESCRIPTION

Embodiments of the present invention recognize a trace of a product's operations concludes when the product undergoes a system dump and does not show the effects on the product's operations after the problem occurred.

Embodiments of the present invention provide the capability to determine a trace of a product following a system dump. Embodiments of the present invention provide the capability to determine a trace as described below with references to FIGS. 1-3.

Implementation of such embodiments may take a variety of forms, and exemplary implementation details are discussed subsequently with reference to the Figures.

Figure 1:
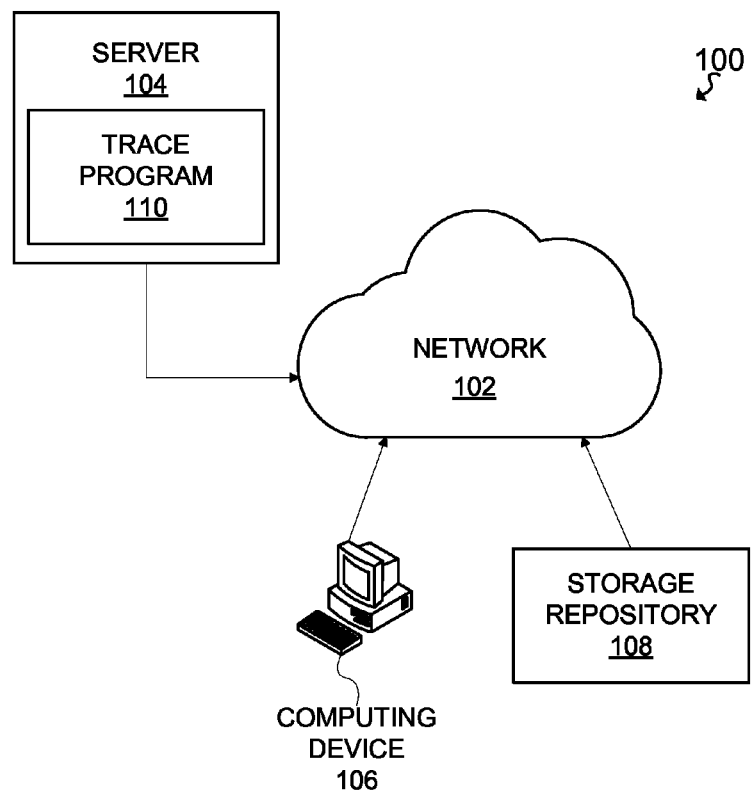
FIG. 1 is a functional block diagram illustrating a data processing environment, in accordance with an embodiment of the present invention.

FIG. 1 is a functional block diagram illustrating a data processing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, which operates trace program 110, computing device 106, and storage repository 108.

In one embodiment, network 102 can be, for example, a local area network (LAN), a telecommunications network, a wide area network (WAN), such as the Internet, a virtual local area network (VLAN), or any combination that can include wired, wireless, or fiber optic connections. Network 102 can also include wire cables, wireless communication links, fiber optic cables, routers, switches and/or firewalls. Network 102 interconnects server 104, computing device 106, and storage repository 108. In general, network 102 can be any combination of connections and protocols capable of supporting communications between server 104, computing device 106, storage repository 108, and trace program 110.

In one embodiment, server 104 is a web-based server hosting trace program 110, in accordance with an embodiment of the present invention. In one embodiment, server 104 can be a web server, a blade server, a mobile computing device, a laptop computer, a tablet computer, a netbook computer, a personal computer (PC), a desktop computer, or any programmable electronic device or computing system capable of receiving and sending data, via network 102, and performing computer-readable program instructions. In another embodiment, server 104 can be a data center, consisting of a collection of networks and servers providing an IT service, such as virtual servers and applications deployed on virtual servers, to an external party. In another embodiment, server 104 represents a computing system utilizing clustered computers and components (e.g., database server computer, application server computers, etc.) that act as a single pool of seamless resources, such as in a cloud computing environment, when accessed within data processing environment 100.

In one embodiment, server 104 includes trace program 110 to determine an extra trace following an event that triggers a system dump on a mainframe product. In an embodiment, trace program 110 receives a system dump request. Trace program 110 determines an initial trace of the system dump. Having determined the initial trace, trace program 110 determines a time period to collect trace entries. Trace program 110 determines a trace table by collecting trace entries for the time period. When the time period ends, trace program 110 determines an extra trace by capturing the data of the collected trace entries.

In one embodiment, trace program 110 operates on a central server, such as server 104. Trace program 110 can be utilized by one or more computing devices, such as computing device 106, via a mobile application downloaded from the central server or a third-party application store, and can be executed on the one or more computing devices. In another embodiment, trace program 110 can be a softwarebased program, downloaded from a central server, such as server 104, and installed on one or more computing devices, such as computing device 106. In yet another embodiment, trace program 110 can be utilized as a software service provided by a third-party cloud service provider (not shown).

In one embodiment, a user, such as a developer, operates computing device 106 that can be, for example, a desktop computer, a laptop computer, a tablet computer, a personal digital assistant (PDA), a smart phone, a thin client, or any other electronic device or computing system capable of communicating with server 104 through network 102. For example, computing device 106 may be a laptop computer capable of connecting to a network, such as network 102, to access and utilize trace program 110 hosted on server 104. In other embodiments, computing device 106 can be any suitable type of mobile device capable of running mobile applications, such as a smart phone, tablet, slate, or any type of device that runs a mobile operating system. In yet other embodiments, computing device 106 can represent a virtual instance operating on a computing system utilizing clustered computers and components (e.g., database server computer, application server computers, etc.) that act as a single pool of seamless resources when accessed within data processing environment 100.

In yet another embodiment, computing device 106 can include a user interface (not shown) for providing an end user with the capability to interact with trace program 110. For example, an end user may access trace program 110 through the user interface to enable trace program 110 to operate on the end user's device. A user interface refers to the information (such as graphic, text, and sound) a program presents to a user and the control sequences the user employs to control the program. In one embodiment, the user interface can be a graphical user interface (GUI). A GUI may allow users to interact with electronic devices, such as a keyboard and mouse, through graphical icons and visual indicators, such as secondary notations, as opposed to text-based interfaces, or typed command labels.

In one embodiment, storage repository 108 includes the capability for storing data including, but not limited to, system dump data, trace data, such as the initial trace and extra trace, and time periods. In some embodiments, trace program 110 accesses, via network 102, storage repository 108 to retrieve system dump data, trace data, and trace entries. In some embodiments, storage repository 108 can contain all available system dump data, trace data, and trace entries. In some other embodiments, trace program 110 can distribute available system dump data, trace data, and trace entries across one or more storage repositories (not shown), which are connected to network 102.

In some embodiments, storage repository 108 can be a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with server 104 and computing device 106, via network 102. In other embodiments, storage repository 108 can represent a virtual instance operating on a computing system utilizing clustered computers and components (e.g., database server computer, application server computers, etc.) that act as a single pool of seamless resources when accessed within data processing environment 100. In another embodiment, storage repository 108 can be a dump data set. In an embodiment, the dump data set can be used to store system dump data, trace data, and trace entries.

Figure 2:
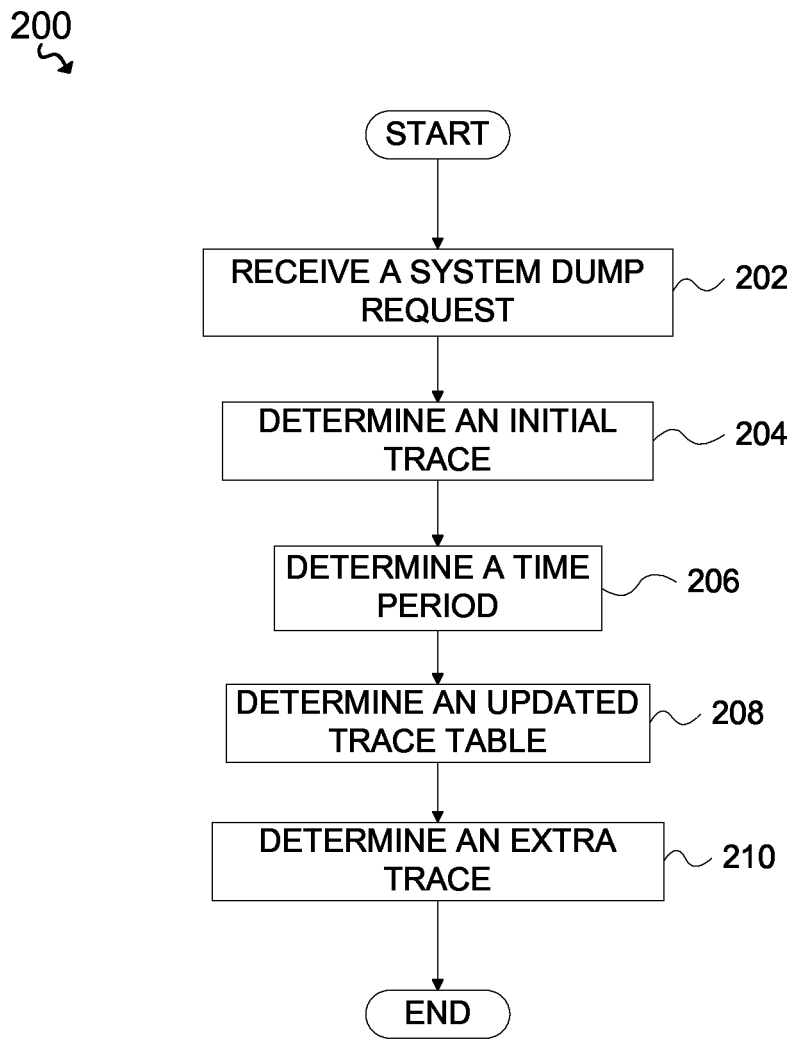
FIG. 2 is a flowchart illustrating operational steps of a trace program (such as the trace program of FIG. 1), in accordance with an embodiment of the present invention.

FIG. 2 is a flowchart illustrating operational steps of trace program 110, generally designated 200, in accordance with an embodiment of the present invention. In some embodiments discussed herein, a device, such as computing device 106, can initiate trace program 110 by connecting to server 104 via network 102.

Trace program 110 receives a system dump request (202). In some embodiments, trace program 110 receives a system dump request where an event (e.g. determining an invalid setting of a variable, determining a storage violation, etc.) triggers a system dump of a mainframe product (e.g. Customer Information Control System Transaction Server (CICS TS®)). The system dump may include a trace, in which the trace comprises one or more trace entries. In an embodiment, trace program 110 receives a system dump request on an operating system (OS), in which the operating system is located on a computing device, such as computing device 106. In another embodiment, trace program 110 receives a system dump request from an application program (e.g. Customer Information Control System (CICS)) on a computing device, such as computing device 106. In an embodiment, the application program resides within the operating system. In another embodiment, the application program resides separate from the operating system. In an embodiment, trace program 110 can receive a system dump request without an identified address or location.

Responsive to receiving a system dump request, trace program 110 determines an initial trace (step 204). In an embodiment, trace program 110 determines the initial trace of the system dump by utilizing a conventional dumping tool (e.g. System Dump (SDUMP®) tool) known in the art. Trace program 110 determines the address space of the storage contents of the product. Trace program 110 performs a system dump of the storage contents utilizing the dumping tool. In an embodiment, the storage contents includes trace entries of the product collected into a trace table. Trace program 110, utilizing the application program, may collect trace entries into the trace table before an event that triggers a system dump. Responsive to dumping the storage contents, trace program 110 captures the data of the system dump and the initial trace, determined from the trace table, of the system dump.

In an embodiment, where trace program 110 receives a system dump request on the operating system, trace program 110 stores the captured initial trace locally on the dumping tool.

In another embodiment, where trace program 110 receives a system dump request from the application program, trace program 110, utilizing the dumping tool, writes the captured data and initial trace of the system dump to storage repository 108. Trace program 110 determines a storage repository name for the captured data and initial trace written to storage repository 108. Trace program 110, utilizing a conventional exit program (e.g. CICS® Dump Global User Exit Program), sends the storage repository name to the application program. Where the application program receives the storage repository name, trace program 110 records the storage repository name locally within the application program.

Trace program 110 determines a time period (step 206). In an embodiment, trace program 110 determines a time period to collect trace entries. In an embodiment, trace program 110 begins the time period following an event that triggered a system dump. In an embodiment, trace program 110 receives the time period from a user. In another embodiment, the time period can be pre-determined, user defined time period. In yet another embodiment, the time period can be a default time period. Trace program 110 may receive the time period prior to an event that triggers a system dump. In an embodiment, trace program 110 stores the time period in storage repository 108. Trace program 110 may retrieve the stored time period from storage repository 108. In another embodiment, trace program 110 stores and retrieves the time period locally on a computing device, such as computing device 106. In an embodiment, trace program 110 can set the time period utilizing the operating system on a computing device, such as computing device 106. In another embodiment, trace program 110 can set the time period utilizing the application program on the computing device. In an embodiment, the time period can run for a duration of time (e.g. 5 seconds, 10 seconds, 1 minute, 1 hour, 1 day, etc.).

Responsive to determining a time period, trace program 110 determines an updated trace table (step 208). In an embodiment, trace program 110, utilizing the application program, determines the updated trace table by collecting the trace entries of the product. In an embodiment, trace program 110 collects the trace entries following the event that triggered the system dump. Trace program 110 may collect the trace entries for the time period. Trace program 110 may store the updated trace table locally on the application program.

Trace program 110 determines an extra trace (step 210) and ends. In an embodiment, trace program 110 determines an extra trace where the time period ends. In some embodiments, trace program 110 utilizes a conventional exit program (e.g. IEASDUMP® exit program) known in the art to determine the extra trace. In one embodiment, an extra trace refers to a plurality of trace data entries collected during a pre-determined time period subsequent to an event triggering a system dump. In one embodiment, trace program 110 appends in the updated trace table the trace entries collected after the event to the trace entries collected before the event. In another embodiment, trace program 110 replaces the trace entries collected before the event with the trace entries collected after the event in the updated trace table, where replacing may include wrapping the trace entries in the updated trace table where the updated trace table cannot store all of the trace entries following an event that triggered a system dump.

In one embodiment, where a system dump is requested on an operating system, trace program 110 identifies one or more parameters (i.e. the address and length) of the updated trace table and associates the one or more parameters to the exit program. Trace program 110, utilizing the exit program, transmits the updated trace table parameters from the application program to the dumping tool. In an embodiment, trace program 110, utilizing the dumping tool, captures the data of the updated trace table as the extra trace. Trace program 110 retrieves the captured initial trace stored locally on the dumping tool. Trace program 110, utilizing the dumping tool, writes the extra trace and the captured initial trace to storage repository 108.

In one embodiment, where trace program 110 receives a system dump request from the application program, trace program 110 identifies one or more parameters (i.e. the address and length of the updated trace table and the storage repository name) and associates them to the exit program. Trace program 110, utilizing the exit program, sets the parameters and passes the parameters to the dumping tool. Trace program 110, utilizing the dumping tool, performs a system dump on the updated trace table and captures the extra trace. Trace program 110 associates the extra trace with the storage repository name. In an embodiment, trace program 110, utilizing the dumping tool, writes the extra trace to storage repository 108. In an embodiment, trace program 110 updates the initial trace in storage repository 108 with the associated extra trace.

In one embodiment, trace program 110 displays the extra trace and initial trace on a user interface to a user. In an embodiment, trace program 110 displays the extra trace at the end of the initial trace. In another embodiment, trace program 110 displays the initial trace at the end of the extra trace. In yet another embodiment, trace program 110 displays the extra trace separate from the initial trace.

Figure 3:
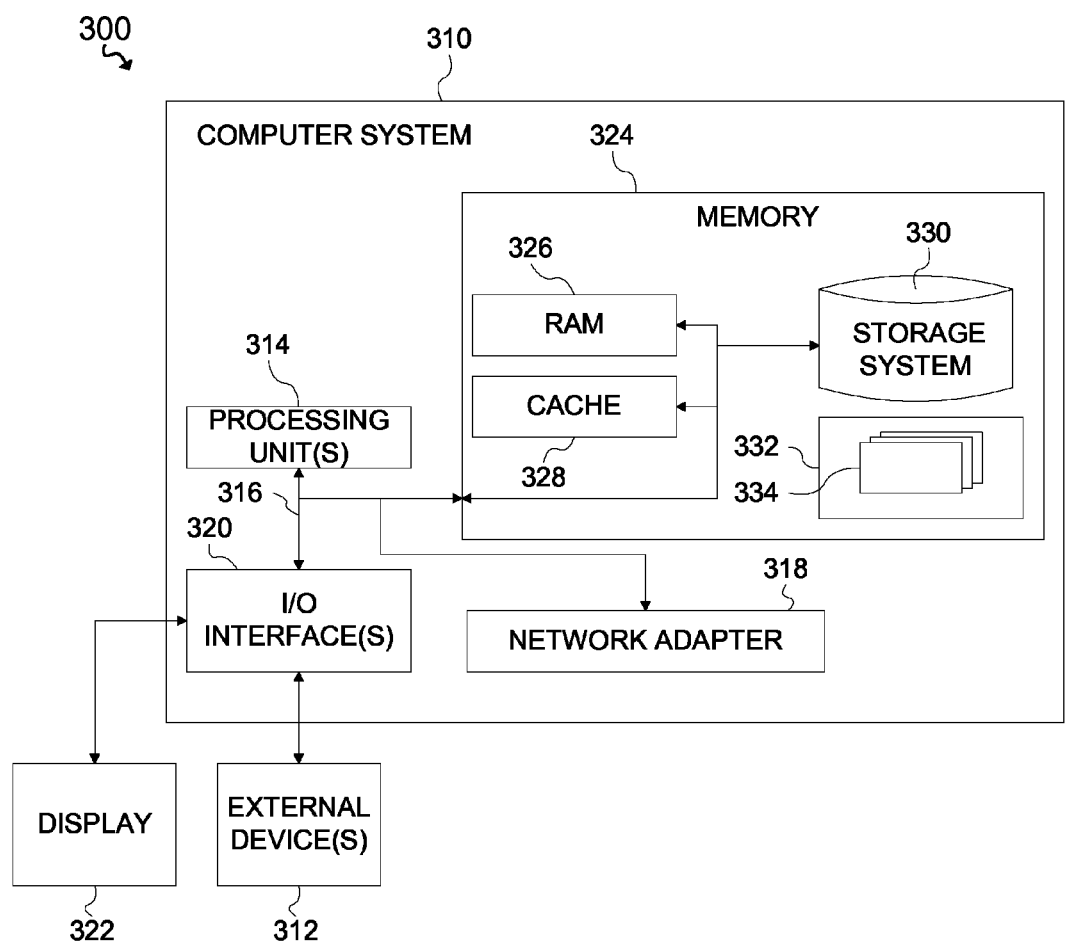
FIG. 3 is a block diagram depicting components of a data processing environment (such as the server of FIG. 1), in accordance with an embodiment of the present invention.

FIG. 3 is a block diagram depicting components of a data processing environment, such as server 104 of data processing environment 100, generally designated 300, in accordance with an embodiment of the present invention. FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer program product for improving system analytics by determining an extra trace of a system dump after an even triggering the system dump, the computer program product comprising:
one or more computer readable storage media and program instructions stored on the one or more computer readable storage media, the program instructions comprising:
program instructions to receive a system dump request, wherein the system dump request includes performing a system dump utilizing a dumping tool, wherein the system dump includes a trace wherein the trace comprises one or more trace entries collected in a trace table;
program instructions to determine an initial trace of the system dump;
program instructions to determine the extra trace, wherein determining the extra trace includes determining a time period subsequent to the initial trace of the system dump to collect trace entries, and wherein the extra trace refers to a plurality of trace data entries collected during the time period subsequent to the initial trace of the system dump and subsequent to an event triggering the system dump;
program instructions to determine an updated trace table, wherein determining the updated trace table includes collecting the plurality of trace entries during the time period subsequent to the initial trace of the system dump and subsequent to an event triggering the system dump, appending the trace table with the plurality of trace entries, and wrapping the one or more trace entries collected in the initial trace of the system dump in the event the updated trace table cannot store all of the plurality of trace entries; and
program instructions to display the extra trace at the end of the initial trace.

2. The computer program product of claim 1, wherein the program instructions to receive a system dump request further comprise at least one of:
program instructions to receive the system dump request from one or more application programs; and
program instructions to receive the system dump request from one or more operating systems.

3. The computer program product of claim 2, wherein the program instructions to receive the system dump request from one or more operating systems further comprise:
program instructions to store the initial trace on the dumping tool;
program instructions to determine one or more parameters of the updated trace table, wherein the one or more parameters comprise an address and length of the updated trace table;
program instructions to associate the one or more parameters to the exit program, wherein the exit program passes the one or more updated trace table parameters from an application program to the dumping tool;
program instructions to utilize the dumping tool to capture data of the updated trace table, wherein the data of the updated trace table is the extra trace;
program instructions to retrieve the initial trace stored on the dumping tool; and
program instructions to write the extra trace and the initial trace to a storage repository.

4. The computer program product of claim 2, wherein the program instructions to receive the system dump request from one or more application programs further comprise:
program instructions to write the initial trace to a storage repository;
program instructions to determine a storage repository name;
program instructions to record the storage repository name on the application program;
program instructions to determine one or more parameters of the updated trace table, wherein the one or more parameters comprise an address and a length of the updated trace table and the storage repository name;
program instructions to associate the one or more parameters to the exit program, wherein the exit program passes the one or more updated trace table parameters from the application program to the dumping tool;
program instructions to utilize the dumping tool to capture data of the updated trace table, wherein the data of the updated trace table is the extra trace;
program instructions to associate the extra trace with the storage repository name; and
program instructions to write the extra trace to the storage repository, wherein the initial trace is updated with the extra trace.

5. The computer program product of claim 1, wherein the time period is a user defined time period, a pre-determined time period, or a default time period.

6. A computer system for improving system analytics by determining an extra trace of a system dump after an event triggering the system dump, the computer system comprising:
one or more computer processors;
one or more computer readable storage media;
program instructions stored on at least one of the one or more computer readable storage media for execution by at least one of the one or more computer processors, the program instructions comprising:
program instructions to receive a system dump request, wherein the system dump request includes performing a system dump utilizing a dumping tool, wherein the system dump includes a trace wherein the trace comprises one or more trace entries collected in a trace table;
program instructions to determine an initial trace of the system dump;
program instructions to determine the extra trace, wherein determining the extra trace includes determining a time period subsequent to the initial trace of the system dump to collect trace entries, and wherein the extra trace refers to a plurality of trace data entries collected during the time period subsequent to the initial trace of the system dump and subsequent to an event triggering the system dump;
program instructions to determine an updated trace table, wherein determining the updated trace table includes collecting the plurality of trace entries during the time period subsequent to the initial trace of the system dump and subsequent to an event triggering the system dump, appending the trace table with the plurality of trace entries, and wrapping the one or more trace entries collected in the initial trace of the system dump in the event the updated trace table cannot store all of the plurality of trace entries; and
program instructions to display the extra trace at the end of the initial trace.

7. The computer system of claim 6, wherein the program instructions to receive a system dump request further comprise at least one of:
program instructions to receive the system dump request from one or more application programs; and
program instructions to receive the system dump request from one or more operating systems.

8. The computer system of claim 7, wherein the program instruction to receive the system dump request from one or more operating systems further comprise:
program instructions to store the initial trace on the dumping tool;
program instructions to determine one or more parameters of the updated trace table, wherein the one or more parameters comprise an address and length of the updated trace table;
program instructions to associate the one or more parameters to the exit program, wherein the exit program passes the one or more updated trace table parameters from an application program to the dumping tool;
program instructions to utilize the dumping tool to capture data of the updated trace table, wherein the data of the updated trace table is the extra trace;
program instructions to retrieve the initial trace stored on the dumping tool; and
program instructions to write the extra trace and the initial trace to a storage repository.

9. The computer system of claim 7, wherein the program instructions to receive the system dump request from one or more application programs further comprise:
program instructions to write the initial trace to a storage repository;
program instructions to determine a storage repository name;
program instructions to record the storage repository name on the application program;
program instructions to determine one or more parameters of the updated trace table, wherein the one or more parameters comprise an address and a length of the updated trace table and the storage repository name;
program instructions to associate the one or more parameters to the exit program, wherein the exit program passes the one or more updated trace table parameters from the application program to the dumping tool;
program instructions to utilize the dumping tool to capture data of the updated trace table, wherein the data of the updated trace table is the extra trace.

* * * * *